United States Patent
Gibson et al.

(10) Patent No.: US 7,657,840 B2
(45) Date of Patent: Feb. 2, 2010

(54) SYSTEM AND METHOD FOR PROVIDING A NAVIGABLE GRID TO ALLOW FOR ACCESSIBLE DRAG-DROP IN VISUAL MODELING TOOLS

(75) Inventors: Becky J. Gibson, Westford, MA (US); Richard S. Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/555,757

(22) Filed: Nov. 2, 2006

(65) Prior Publication Data

US 2008/0109743 A1      May 8, 2008

(51) Int. Cl.
G06F 3/048  (2006.01)

(52) U.S. Cl. ............... 715/769; 715/964; 715/768; 715/858; 345/651; 345/662; 345/677

(58) Field of Classification Search ............... 715/769, 715/768, 770, 848, 849, 850, 851, 852, 858, 715/964; 345/650, 651, 661, 662, 674, 676, 345/677
See application file for complete search history.

(56) References Cited

U.S. PATENT DOCUMENTS

| | | | | |
|---|---|---|---|---|
| 5,317,732 A | * | 5/1994 | Gerlach et al. ........... | 707/104.1 |
| 5,625,823 A | * | 4/1997 | Debenedictis et al. ....... | 717/139 |
| 5,798,752 A | * | 8/1998 | Buxton et al. ............... | 715/863 |
| 5,802,255 A | * | 9/1998 | Hughes et al. ................. | 706/59 |
| 6,065,021 A | * | 5/2000 | George ........................ | 715/245 |
| 6,480,194 B1 | * | 11/2002 | Sang'udi et al. ............ | 345/440 |
| 7,002,571 B2 | * | 2/2006 | Lake et al. ................... | 345/420 |
| 2003/0229856 A1 | * | 12/2003 | Lynn et al. ................... | 715/517 |
| 2004/0183831 A1 | * | 9/2004 | Ritchy et al. ................. | 345/762 |
| 2004/0239693 A1 | * | 12/2004 | Mullen et al. ............... | 345/677 |
| 2005/0028115 A1 | * | 2/2005 | Whitefield et al. ............. | 716/4 |
| 2006/0069635 A1 | * | 3/2006 | Ram et al. ..................... | 705/37 |
| 2007/0035514 A1 | * | 2/2007 | Kubo et al. .................. | 345/157 |
| 2007/0079282 A1 | * | 4/2007 | Nachnani et al. ............ | 717/106 |

* cited by examiner

*Primary Examiner*—Weilun Lo
*Assistant Examiner*—Rashedul Hassan
(74) *Attorney, Agent, or Firm*—Jill A. Poimboeuf; Suiter Swantz pc llo

(57) ABSTRACT

The present invention is a method for providing a navigable grid to allow for accessible drag-drop in visual modeling tools. The method includes receiving an input which selects an object. The method further includes providing a visual canvas on a display device. The method further includes overlaying the navigable grid onto the canvas, the overlying navigable grid being of a defined granularity, the defined granularity being based on an underlying application being implemented, the overlying navigable grid further being keyed input device-navigable based on the defined granularity. The method further includes designating a drop position on the navigable grid when a position input is received via a keyed input device. The method further includes dropping the object onto a destination position of the canvas when a drop command input is received. The drop position on the overlying navigable grid is directly aligned over the destination position of the canvas.

13 Claims, 3 Drawing Sheets

SYSTEM AND METHOD FOR PROVIDING A NAVIGABLE GRID TO ALLOW FOR ACCESSIBLE DRAG-DROP IN VISUAL MODELING TOOLS

FIELD OF THE INVENTION

The present invention relates to the field of emerging intranet technology and particularly to a system and method for providing a navigable grid to allow for accessible drag-drop in visual modeling tools.

BACKGROUND OF THE INVENTION

Current visualization tools for computer-based modeling may suffer from accessibility problems. For instance, a number of these visualization tools may be highly dependent upon the use of drag/drop schemes. Current drag/drop schemes may require a user to select an object from a palette, drag the object from the palette to a visual canvas, and drop the object upon a visual rendering of said object. Connections may then be established between the dropped object and other objects already existing on the visual canvas. However, for users having impaired vision or limited manual dexterity, current drag/drop schemes may be difficult to work with. For example, users with impaired vision may lack the spatial context to easily and accurately position objects when working with existing drag/drop schemes. Further, users having limited manual dexterity may lack the hand-eye coordination necessary for easily and accurately maneuvering objects when working with existing drag/drop schemes.

Therefore, it may be desirable to provide a system and method for providing a navigable grid to allow for accessible drag-drop in visual modeling tools which addresses the above-referenced problems and limitations of the current solutions.

SUMMARY OF THE INVENTION

Accordingly, an embodiment of the present invention is directed to a method for providing a navigable grid to allow for accessible drag-drop in visual modeling tools. The method includes receiving an input which selects an object. The method further includes providing a visual canvas on a display device. The method further includes overlaying the navigable grid onto the visual canvas, the overlying navigable grid being of a defined granularity, the defined granularity being based on an underlying application being implemented, the overlying navigable grid further being keyed input device-navigable based on the defined granularity. The method further includes designating a drop position on the navigable grid when a position input is received via the keyed input device. The method further includes dropping the object onto a destination position of the visual canvas when a drop command input is received. Further, the drop position on the overlying navigable grid is directly aligned over the destination position of the visual canvas.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
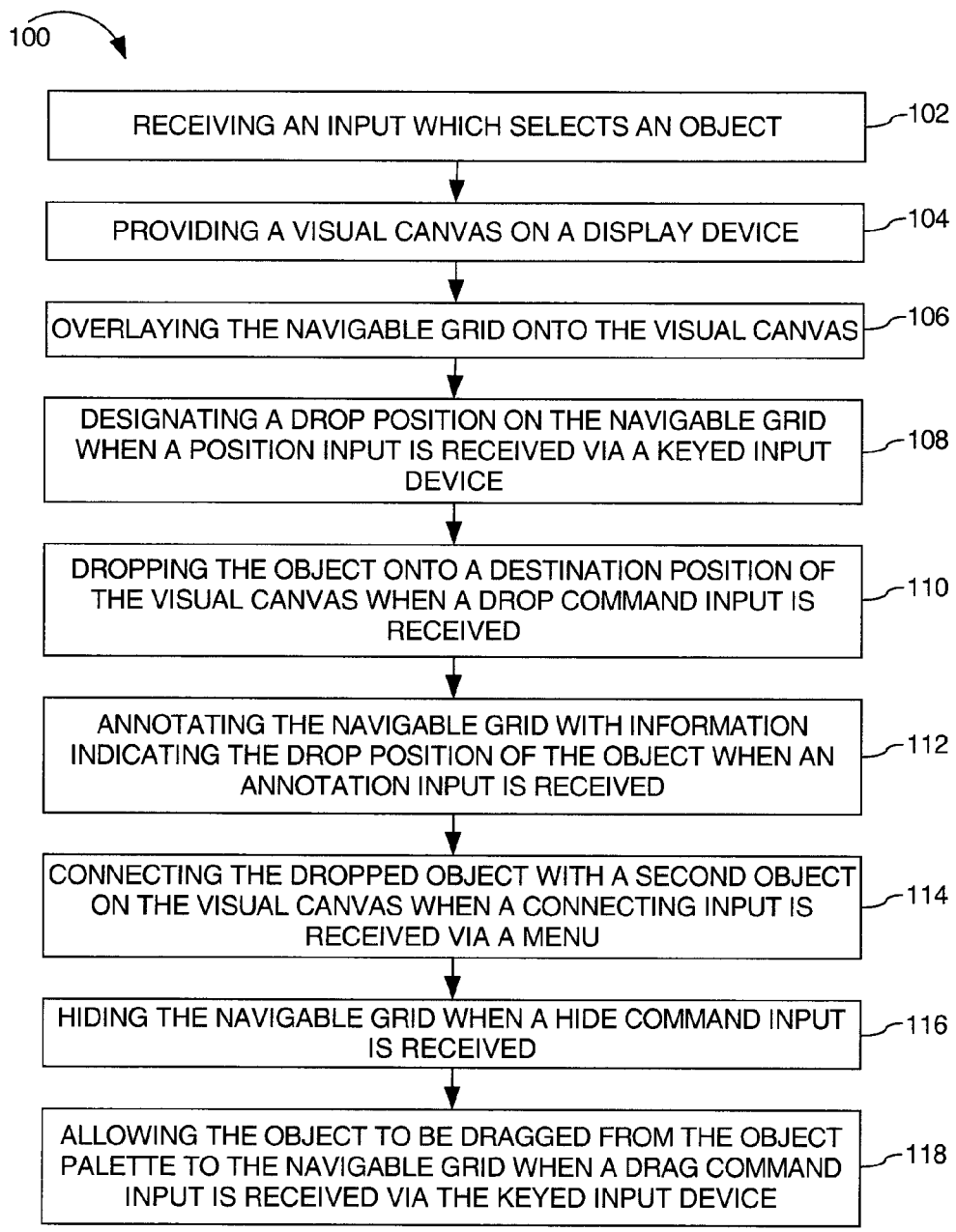
FIG. 1 is a flow chart illustrating a method for providing a navigable grid to allow for accessible drag-drop in visual modeling tools in accordance with an exemplary embodiment of the present invention.

FIG. 1 is a flow chart illustrating a method for providing a navigable grid (202, 302—See FIGS. 2 and 3) to allow for accessible drag-drop in visual modeling tools. The method 100 includes receiving an input which selects an object 102. In a present embodiment, the object-selecting input may be received via a user input device, such as a keyboard, a mouse, a touchpad or the like. In an exemplary embodiment, the object may be one of a number of objects stored on an object palette, such as an object palette used in typical visual modeling tools. However, with the present invention, the object palette may be navigable via a keyed input device, such as a keyboard, touchpad, or the like to promote ease of navigation amongst the objects and ease of selection of the objects.

Figure 2:
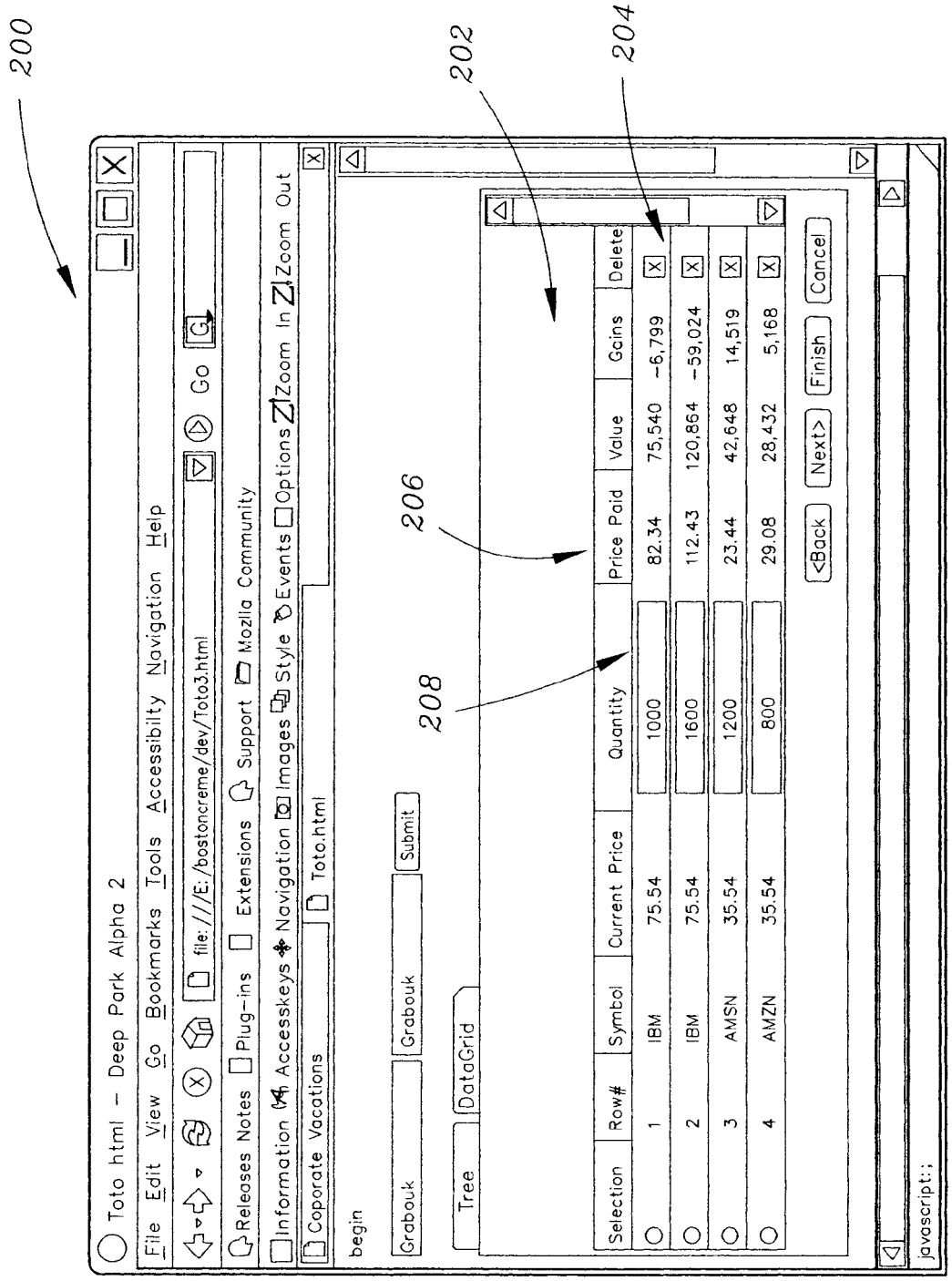
FIG. 2 is an illustration of an accessible, keyed input device-navigable datagrid on a web page in accordance with an exemplary embodiment of the present invention.
Figure 3:
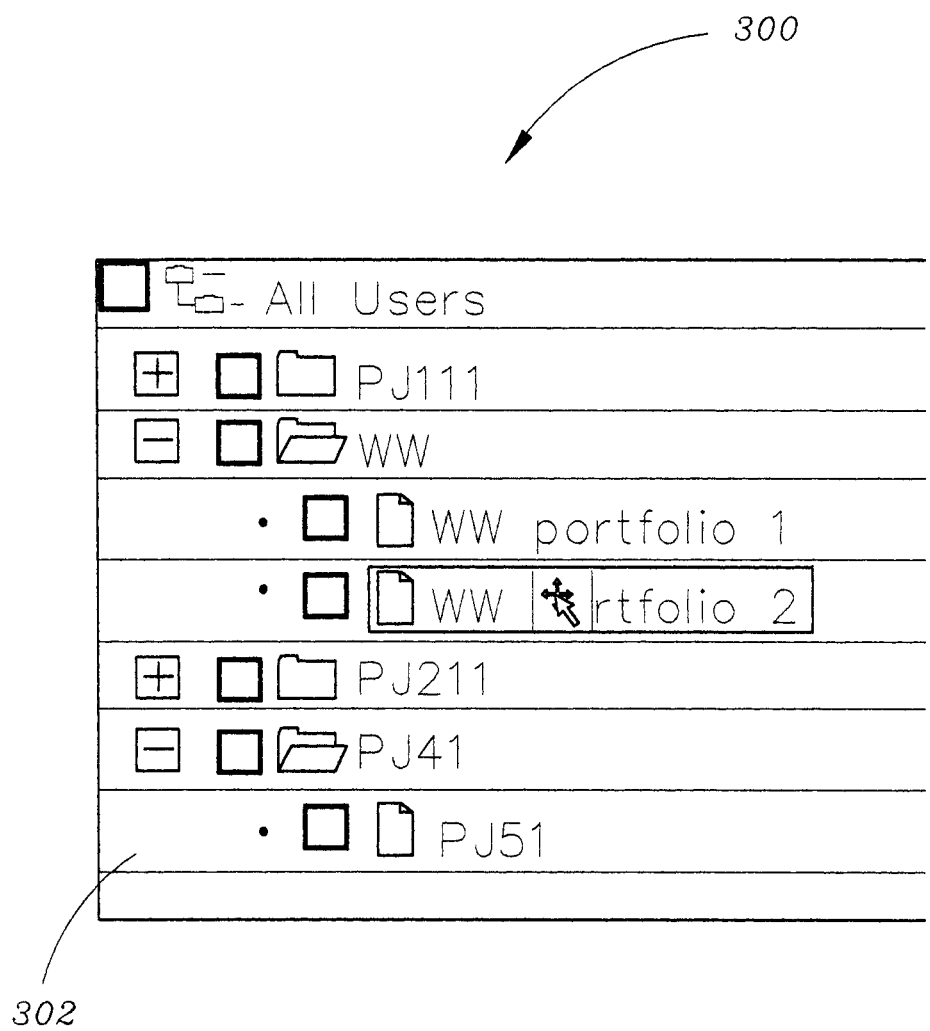
FIG. 3 is an illustration of a tree control with a navigable grid in accordance with an exemplary embodiment of the present invention.

The method 100 further includes providing a visual canvas on a display device, such as a monitor 104. In a present embodiment, the visual canvas and/or the object palette may be included as part of a web page (FIG. 2, 200). In further embodiments, the visual canvas and/or the object palette may be implemented with Rich Internet Applications, such as Ajax (Asynchronous JavaScript™ and XML), IBM Workplace™, or the like. In additional embodiments, the visual canvas and/or the object palette may be implemented in GUI-based modeling solutions or with a tree control (FIG. 3, 300).

The method 100 further includes overlaying the navigable grid onto the visual canvas 106, the overlying navigable grid being of a defined granularity based on an underlying application being implemented, the overlying navigable grid further being keyed input device-navigable based on the defined granularity. In an exemplary embodiment, the navigable grid is a two-dimensional datagrid. By overlaying the navigable grid onto the visual canvas, it may be easier for a user to accurately place objects from the object palette in a desired location on the visual canvas.

The method 100 further includes designating a drop position on the navigable grid when a position input is received via the keyed input device 108. In a present embodiment, the navigable grid is navigable via a keyed input device, such as a keyboard, touchpad or the like. By making the navigable grid so that it is keyed input device-navigable, the present invention may promote ease of navigation within the navigable grid. For example, a user may be able to use arrow keys of a keyboard to navigate amongst rows (204), columns (206), or cells (208) of the navigable grid so as to pinpoint a desired location on the visual canvas more easily than when using a mouse. As discussed above, the grid is keyed input device-navigable based on the granularity of the grid. For instance, a user may navigate the grid only as the granularity of the grid allows (ex.—with each input via an arrow key, a user may only be able to move an object, cursor or the like incrementally amongst the cells, columns, and/or rows defined by the granularity of the grid, such as cell-to-cell, column-to-column and/or row-to-row). In a present embodiment, as discussed above, the drop position may be designated on the navigable grid when a position input is received via the keyed input device. For instance, the keyed input device may be a keyboard, while the position input may be a keystroke of an arrow key. A user may provide one or more inputs via the arrow keys to navigate the navigable grid and designate the drop position on the navigable grid. In the exemplary embodiment, the drop position on the overlying navigable grid is directly aligned over a destination position of the visual canvas, the destination position being a position on the visual canvas where the selected object is to be placed or dropped. The method 100 further includes dropping the object onto a destination position of the visual canvas when a drop command input is received 110. In an exemplary embodiment, the selected object may be dropped onto the destination position of the visual canvas when a drop command input, such as an input made to a keyed input device, is received.

The method 100 further includes annotating the navigable grid with information indicating the drop position of the object when an annotation input is received 112. In a present embodiment, the navigable grid may be configured so that text or character data may be added, such as via one or more annotation inputs (ex.—text entry inputs via a keyboard) by a user, to rows, columns, and/or cells of the navigable grid. Such annotation capability may allow a user to annotate the navigable grid prior to performing visual modeling for the purpose of annotating one or more drop positions for one or more corresponding objects. For instance, when the navigable grid is being utilized to assist a user in positioning objects on a visual canvas in a visual modeling drawing, the navigable grid may include annotation information which may indicate to the user location(s) of one or more desired drop positions for one or more objects. The above-described annotation of the navigable grid may allow for a user to more quickly determine where objects should be placed on the navigable grid. In further embodiments, a previously annotated navigable grid may serve as a template when attempting to duplicate a previous visual modeling drawing.

The method 100 further includes connecting the dropped object with a second object on the visual canvas when a connecting input is received via a menu 114. For instance, once an object has been dropped onto the visual canvas, it may be desirable to connect it, such as via connecting lines or the like, to a second object on the visual canvas, via a connecting input received via a keyed input device, mouse or the like. Further, the connecting input may be received when a selection is made from a menu. For example, with the navigable grid still displayed, a user may select the dropped object via a user input, navigate along the navigable grid to the second object, and further select the second object via user input. The user may then connect the dropped object with the second object via a menu selection.

The method 100 further includes hiding the navigable grid when a hide command input is received 116. For instance, when a user has completed visual modeling, the user may want to hide the navigable grid from view until the navigable grid is needed again. The present invention allows a hide command input, such as via a drop-down menu selection, to be received from the user via a user input device, such as a keyboard or mouse, which, when received, said hide command input will cause the navigable grid to be removed from view (ex—taken off of the visual canvas). Further, the navigable grid may be replaced (i.e., overlaid back onto the visual canvas) upon receipt of a replace input entered via a user input device, such as a keyboard or mouse.

The method 100 further includes allowing the object to be dragged from the object palette to the navigable grid when a drag command input is received via the keyed input device 118. In an exemplary embodiment, as discussed above, the object may be selected from an object palette, such as by an object-selecting input received via a keyed input device (ex.—keyboard). Once selected, the object may be dragged from the object palette to the navigable grid when a drag command input is received via the keyed input device. For instance, the user may use arrow keys of a keyboard to drag the object to the navigable grid. Further, the user may then, via the keyboard, move focus to the visual canvas, to which the keyboard-navigable grid is overlaid. Still further, the user may use the arrow keys of the keyboard (as discussed above) to navigate (ex—"drag") the object along the navigable grid to select a drop position for the object. For example, while navigating the grid to determine a drop position for the object, the object (which is being navigated or "dragged" along/within the grid) may be distinguishably (such as via a distinguishing color or distinguishing outline, as seen in FIG. 3) visible above the grid.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, and the like) may be coupled to the system either directly or through intervening I/O controllers.

Network adapters may also be coupled to the system to enable the data processing system to connect to other data processing systems or storage devices through intervening private or public networks. Telephone modems, cable or DSL modems and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages are to be understood by the foregoing description, and it is apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a navigable grid to allow for accessible drag-drop in visual modeling tools, comprising:
receiving an input which selects an object, wherein the object is selected from an object palette, the object palette being navigable via a keyed input device;
providing a visual canvas on a display device;
overlaying the navigable grid onto the visual canvas, said navigable grid being user-viewable, the overlying navigable grid being of a defined granularity, the defined granularity being based on an underlying application being implemented, the defined granularity being one of: a cell-to-cell granularity, a column-to-column granularity, and a row-to-row granularity, the overlying navigable grid further being keyed input device-navigable based on the defined granularity;
when a position input is received via the keyed input device, designating a drop position on the navigable grid; and
dropping the object onto a destination position of the visual canvas when a drop command input is received,
wherein the drop position on the overlying navigable grid is directly aligned over the destination position of the visual canvas.

2. A method as claimed in claim 1, wherein the navigable grid is a two-dimensional datagrid.

3. A method as claimed in claim 1, further comprising:
annotating the navigable grid with information indicating the drop position of the object when an annotation input is received.

4. A method as claimed in claim 1, further comprising:
connecting the dropped object with a second object on the visual canvas when a connecting input is received via a menu.

5. A method as claimed in claim 1, further comprising:
hiding the navigable grid when a hide command input is received.

6. A method as claimed in claim 1, wherein the visual canvas is included on a web page.

7. A method as claimed in claim 1, further comprising:
allowing the object to be dragged from the object palette to the navigable grid when a drag command input is received via the keyed input device.

8. A computer program product for performing a method for providing a navigable grid to allow for accessible drag-drop in visual modeling tools, said computer program product comprising:
a computer readable storage medium having computer readable program code embodied therewith, the computer readable program code including:
computer readable program code configured to receive an input which selects an object, wherein the object is selected from a keyed input device-navigable object palette, said keyed input device being one of: a keyboard; a touchpad; and a GUI;
computer readable program code configured to provide a visual canvas on a display device;
computer readable program code configured to overlay the navigable grid onto the visual canvas, said navigable grid being user-viewable, the overlying navigable grid being of a defined granularity, the defined granularity being one of: a cell-to-cell granularity, a column-to-column granularity, and a row-to-row granularity, the defined granularity being based on an underlying application being implemented, the overlying navigable grid further being keyed input device-navigable based on the defined granularity;
computer readable program code configured to designate a drop position on the navigable grid when a position input is received via the keyed input device; and
computer readable program code configured to drop the object onto a destination position of the visual canvas when a drop command input is received,
wherein the drop position on the overlying navigable grid is directly aligned over the destination position of the visual canvas.

9. A computer program product as claimed in claim 8, wherein the navigable grid is a two-dimensional datagrid.

10. A computer program product as claimed in claim 8, further comprising:
computer readable program code configured to annotate the navigable grid with information indicating the drop position of the object when an annotation input is received.

11. A computer program product as claimed in claim 8, further comprising:
computer readable program code configured to connect the dropped object with a second object on the visual canvas when a connecting input is received via a menu.

12. A computer program product as claimed in claim 8, further comprising:
computer readable program code configured to hide the navigable grid when a hide command input is received.

13. A computer program product as claimed in claim 8, further comprising:
computer readable program code configured to allow the object to be dragged from the object palette to the navigable grid when a drag command input is received via the keyed input device.

* * * * *